US012461627B2

(12) United States Patent
Liao et al.

(10) Patent No.: US 12,461,627 B2
(45) Date of Patent: Nov. 4, 2025

(54) ELECTRONIC DEVICE INCLUDING A TOUCH DETECTION SYSTEM AND A NOISE DETECTION SYSTEM

(71) Applicant: Microchip Technology Incorporated, Chandler, AZ (US)

(72) Inventors: Pitter Liao, Guangdong (CN); Roger Zhu, GuangDong (CN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/600,960

(22) Filed: Mar. 11, 2024

(65) Prior Publication Data

US 2025/0284365 A1 Sep. 11, 2025

(30) Foreign Application Priority Data

Mar. 5, 2024 (CN) .......................... 202410250784.7

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ....................................................... G06F 3/044
USPC ................................................... 345/173–174
See application file for complete search history.

(56) References Cited

U.S. PATENT DOCUMENTS 12,124,657 B2 * 10/2024 Maharyta .............. G06F 3/0446
2012/0306803 A1 12/2012 Kuo .............................. 345/174
2013/0181943 A1 * 7/2013 Bulea ..................... G06F 3/041
345/174
2013/0257789 A1 10/2013 Kwon et al. .................. 345/174
2014/0074436 A1 3/2014 Voris et al. ................... 702/194
(Continued)

FOREIGN PATENT DOCUMENTS

EP            2767890 A1      8/2014
JP            6284838 B2      2/2018
WO       2015/122714 A1      8/2015

OTHER PUBLICATIONS

International Search Report and Written Opinion, Application No. PCT/US2024/045259, 14 pages, Nov. 11, 2024.

*Primary Examiner* — Kwin Xie

(74) *Attorney, Agent, or Firm* — SLAYDEN GRUBERT BEARD PLLC

(57) ABSTRACT

An electronic device includes a touch detection system and a noise detection system. The touch detection system includes a first capacitive sensing channel, and a touch detection circuitry to perform a series of touch detections based on a capacitance on the first capacitive sensing channel. The noise detection system includes a second capacitive sensing channel, and a noise detection circuitry to perform at least one noise detection measurement, wherein a respective noise detection measurement comprises determining a respective noise-related capacitance measure associated with a capacitance on the second capacitive channel. The noise detection system to determine a presence of a noise condition based on the at least one noise detection measurement, and in response to determining the noise condition, generate a touch detection inhibit signal to inhibit at least one touch detection in the series of touch detections.

24 Claims, 9 Drawing Sheets

(56) References Cited

U.S. PATENT DOCUMENTS

| | | | |
|---|---|---|---|
| 2015/0035797 A1* | 2/2015 | Shahparnia | G06F 3/03545 |
| | | | 345/87 |
| 2015/0193081 A1 | 7/2015 | Liu | 345/174 |
| 2015/0324035 A1* | 11/2015 | Yuan | G06F 3/04166 |
| | | | 345/174 |
| 2016/0170530 A1* | 6/2016 | Lee | G06F 3/0443 |
| | | | 345/174 |
| 2016/0183382 A1* | 6/2016 | Solven | G06F 3/0445 |
| | | | 29/830 |
| 2020/0409500 A1* | 12/2020 | Kim | G06F 3/044 |
| 2021/0173523 A1 | 6/2021 | Lee | |
| 2023/0157123 A1* | 5/2023 | Kubota | H05B 33/26 |
| | | | 257/40 |
| 2023/0409156 A1 | 12/2023 | Kim et al. | |

\* cited by examiner

ELECTRONIC DEVICE INCLUDING A TOUCH DETECTION SYSTEM AND A NOISE DETECTION SYSTEM

RELATED APPLICATION

This application claims priority to commonly owned Chinese Patent Application No. 202410250784.7 filed Mar. 5, 2024, the entire contents of which application are hereby incorporated by reference for all purposes.

BACKGROUND

A conventional mutual capacitance sensing system touch detection includes one or more sensing channels for detecting a variance in capacitance, which may indicate a touch, for example a touch on a touchscreen or other touch device. To measure the capacitance on each channel, a burst wave may be transmitted from a transmit pin (referred to as an "X pin") and a resulting signal may be measured (sampled) at a corresponding receiving pin (referred to as a "Y pin"). A respective X-Y pin pair defines a respective sensing channel of the relevant touch device (e.g., touchscreen).

Conventional capacitance sensing systems, e.g., touch detection systems described above, are commonly affected by noise, which may provide erroneous touch detection results. Noise may include, for example, voltage ripple, radiation emissions, and electrostatic discharge proximate the capacitance sensing system, without limitation.

There is a need for an improved capacitance sensing system, e.g., for use in a touchscreen or other touch device.

SUMMARY

The present disclosure provides an electronic device including a touch detection system, e.g., to detect touches on a touchscreen or other touch device, and a noise detection system to detect noise conditions, and in response, to generate touch detection inhibit signals to inhibit touch detection(s) of the touch detection system, for example to prevent erroneous (e.g., false positive) touch detections.

One aspect provides an electronic device including a touch detection system and a noise detection system. The touch detection system includes a first capacitive sensing channel, and a touch detection circuitry to perform a series of touch detections based on a capacitance on the first capacitive sensing channel. The noise detection system includes a second capacitive sensing channel, and a noise detection circuitry to perform at least one noise detection measurement, wherein a respective noise detection measurement comprises determining a respective noise-related capacitance measure associated with a capacitance on the second capacitive channel, determine a presence of a noise condition based on the at least one noise detection measurement, and in response to determining the noise condition, generate a touch detection inhibit signal to inhibit at least one touch detection in the series of touch detections.

In some examples, the electronic device includes a sense electrode, a touch detection electrode, and a noise detection electrode, wherein the first capacitive sensing channel includes a capacitive coupling between the touch detection electrode and the sense electrode, and wherein the second capacitive sensing channel includes a capacitive coupling between the noise detection electrode and the sense electrode.

In some examples, performing a respective touch detection in the series of touch detections comprises detecting a touch-related capacitance measure at the sense electrode at a first time, and performing the respective noise detection measurement comprises detecting the respective noise-related capacitance measure at the sense electrode at a second time distinct from the first time.

In some examples, the electronic device comprises an IC package including an IC die including the touch detection circuitry, the noise detection circuitry, and a plurality of IC die pads including a first IC die pad, a second IC die pad, and a third IC die pad. The IC package includes a plurality of IC package pins, including a first IC package pin connected to the first IC die pad, and a second IC package pin connected to the second IC die pad. The sense electrode includes the first IC die pad and the first IC package pin connected to the first IC die pad, the wherein the touch detection electrode includes the second IC die pad and the second IC package pin connected to the second IC die pad, and the noise detection electrode comprises the third IC die pad.

In some examples, the noise detection electrode comprises the third IC die pad and a conductive trace extending from the third IC die pad.

In some examples, the plurality of IC package pins includes a third IC package pin connected to the third IC die pad, and the noise detection electrode comprises the third IC die pad and the third IC package pin connected to the third IC die pad.

In some examples, the sense electrode includes a first touch electrode element connected to the first IC die pad, the touch detection electrode includes a second touch electrode element connected to the second IC die pad, and the noise detection electrode includes a third touch electrode element connected to the third IC die pad.

In some examples, the electronic device includes a touch detection electrode, a first sense electrode, a noise detection electrode, and a second sense electrode, wherein the first capacitive sensing channel includes a capacitive coupling between the touch detection electrode and the first sense electrode, and wherein the second capacitive sensing channel includes a capacitive coupling between the noise detection electrode and the second sense electrode.

In some examples, determining the presence of the noise condition based on the at least one noise-related capacitance measurement comprises comparing the at least one noise-related capacitance measure to a noise detection threshold.

In some examples, generating the touch detection inhibit signal to inhibit the at least one touch detection comprises generating the touch detection inhibit signal to prevent a performance of the at least one touch detection.

In some examples, generating the touch detection inhibit signal to inhibit the at least one touch detection comprises generating the touch detection inhibit signal to inhibit a usage of the at least one touch detection.

In some examples, generating the touch detection inhibit signal to inhibit the at least one touch detection comprises generating the touch detection inhibit signal to inhibit a predefined multiple number of touch detections.

In some examples, the noise detection circuitry to (a) perform at least one further noise detection measurement, wherein a respective further noise detection measurement comprises determining a respective further noise-related capacitance measure associated with the capacitance on the second capacitive channel, (b) determine an absence of the noise condition based on the at least one further noise detection measurement, and (c) in response to the determination of the absence of the noise condition, not generate the touch detection inhibit signal.

In some examples, the touch detection circuitry to perform a respective touch detection in the series of touch detections by determining a capacitance measure associated with a capacitance on the first capacitive sensing channel, and comparing the touch-related capacitance measurement to a touch detection threshold.

In some examples, the device comprises a touch device including a first touch electrode element and a second touch electrode element, and the first capacitive sensing channel includes a capacitive coupling between the first touch electrode element and the second touch electrode element.

In some examples, the electronic device comprises an IC die including the touch detection circuitry and the noise detection circuitry, and a touch device including a first touch electrode element connected to a first IC pad of the IC die, and a second touch electrode element connected to a second IC pad of the IC die and capacitively coupled to the first touch electrode element. The first touch electrode element and the second touch electrode element are arranged along the first capacitive sensing channel, and the touch detection circuitry to perform a series of touch detections based on a capacitive coupling between the first touch electrode element and the second touch electrode element.

One aspect provides a method including performing, using a touch detection circuitry provided in an integrated circuit, at least one first touch detection based on a capacitance on a first capacitive sensing channel; performing, using a noise detection circuitry provided in the IC device, at least one noise detection measurement based on a capacitance on a second capacitive channel; determining, by the noise detection circuitry, a presence of a noise condition based on the at least one noise detection measurement; and in response to determining the presence of the noise condition, inhibiting at least one second touch detection.

In some examples, performing the at least one noise detection comprises determining at least one noise-related capacitance measure associated with the capacitance on the second capacitive channel, and determining the presence of the noise condition comprises comparing the at least one noise-related capacitance measure to a noise detection threshold.

In some examples, inhibiting at least one second touch detection comprises preventing a performance of at least one second touch detection by the touch detection circuitry.

In some examples, inhibiting at least one second touch detection comprises preventing a predefined number of second touch detections or preventing second touch detections for a predefined period of time.

In some examples, inhibiting at least one second touch detection comprises preventing second touch detections until a determination, by the noise detection circuitry, that the noise condition is absent.

In some examples, the determination, by the noise detection circuitry, that the noise condition is absent comprises a determination, by the noise detection circuitry, that the noise condition is not present for a predefined minimum number of noise detection measurements.

In some examples, inhibiting at least one second touch detection comprises preventing or inhibiting a use of at least one second touch detection performed by the touch detection circuitry.

In some examples, performing at least one first touch detection comprises detecting at least one first touch at a touch device, and inhibiting at least one second touch detection comprises (a) inhibiting a detection of at least one second touch at the touch device or (b) inhibiting a use of at least one detected second touch at the touch device.

DESCRIPTION OF THE DRAWINGS

Example aspects of the present disclosure are described below in conjunction with the figures, in which.

It should be understood that the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1:
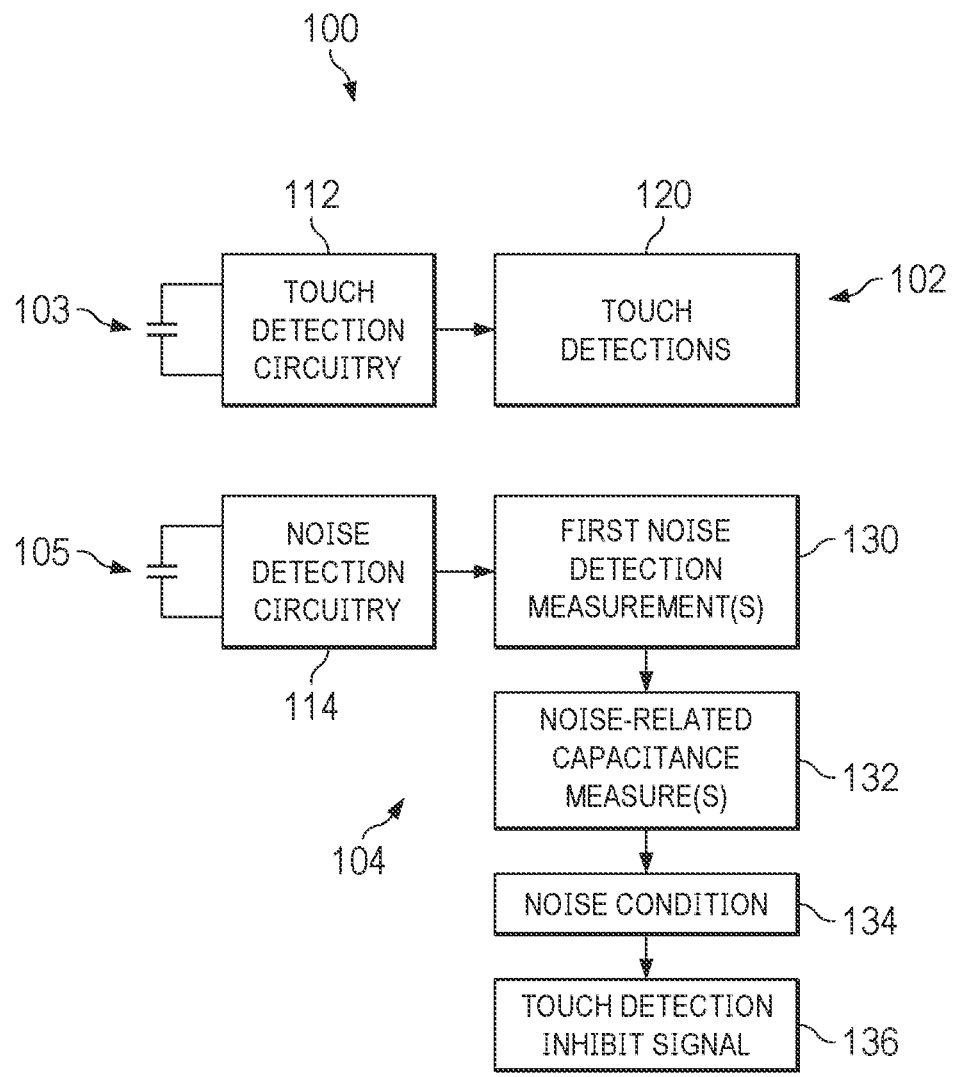
FIG. 1 shows an example electronic device including a touch detection system for capacitive touch detection, and a noise detection system for detecting noise conditions and controlling the operation of the electronic device in response to detected noise conditions.

FIG. 1 shows an example electronic device 100 including a touch detection system 102 (e.g., a mutual capacitance touch detection system) for capacitive touch detection and a noise detection system 104 for detecting noise conditions and controlling the operation of the electronic device 100 in response to detected noise conditions.

The touch detection system 102 includes a first capacitive sensing channel 103 and a touch detection circuitry 112 to perform a series of touch detections 120 based on a capacitance on the first capacitive sensing channel 103. The first capacitive sensing channel 103 may also be referred to as a "touch detection channel." In some examples, a respective touch detection 120 may include determining a capacitance measure (e.g., at least one voltage or current, without limitation) associated with a capacitance on the first capacitive sensing channel 103, comparing the capacitance measure to a touch detection threshold, and detecting a touch if the capacitance measure exceeds the touch detection threshold.

The noise detection system 104 includes a second capacitive sensing channel 105, and a noise detection circuitry 114 to (a) perform noise detection measurement(s) 130 to determine noise-related capacitance measure(s) 132 associated with a capacitance on the second capacitive sensing channel 105, (c) determine a presence (or absence) of a noise condition 134 based on the noise-related capacitance measure(s) 132, and in response to determining the noise condition 134 is present, generate a touch detection inhibit signal 136 to inhibit at least one touch detection 120, for example to prevent or inhibit the performance or usage of at least one touch detection 120 during noisy periods (i.e., periods in which the noise condition 134 is present). The second capacitive sensing channel 105 may also be referred to as a "noise detection channel."

As used herein, a "capacitive sensing channel" (e.g., first capacitive sensing channel 103 or second capacitive sensing channel 105, without limitation) refers to a circuit including at least two capacitively coupled electrodes, wherein the circuit is connected to respective circuitry (e.g., touch detection circuitry 112 or noise detection circuitry 114, without limitation) for detecting, measuring, or otherwise sensing a capacitance between the electrodes, which capacitance is also referred to herein as the capacitance on the respective capacitive sensing channel.

As discussed in more detail below, in some examples the first capacitive sensing channel 103 may comprise a capacitive coupling between a touch detection electrode and a sense electrode, and the second capacitive sensing channel 105 comprise a capacitive coupling between a noise detection electrode and the same sense electrode or another sense electrode. In the various example disclosed herein, a device may perform either active or passive touch detection on the respective first capacitive sensing channel 103 (touch detection channel), and may perform either active or passive noise detection on the respective second capacitive sensing channel 105 (noise detection channel).

In examples that utilize active touch detection on the first capacitive sensing channel 103 (touch detection channel), the touch detection electrode may comprise a "transmit" or "drive" electrode over which electrical signals (e.g., wave bursts) are transmitted, and the sense electrode may comprise a "receive" or other electrode at which resulting electrical signals (e.g., voltage or current) are sensed. In examples that utilize passive touch detection on the first capacitive sensing channel 103, the touch detection electrode and sense electrode respectively may comprise passive electrodes, wherein electrical signals (e.g., voltage or current) may be sensed at one or both passive electrodes and analyzed for touch detection.

Similarly, in examples that utilize active noise detection on the second capacitive sensing channel 105 (noise detection channel), the noise detection electrode may comprise a "transmit" or "drive" electrode over which electrical signals (e.g., wave bursts) are transmitted, and the sense electrode may comprise a "receive" or other electrode at which resulting electrical signals (e.g., voltage or current) are sensed. In examples that utilize passive noise detection on the second capacitive sensing channel 105, the noise detection electrode and sense electrode respectively may comprise passive electrodes, wherein electrical signals (e.g., voltage or current) may be sensed at one or both passive electrodes and analyzed for noise detection.

As discussed below, the touch detection electrode, noise detection electrode, and sense electrode(s) may respectively include (a) conductive elements of an integrated circuit (IC) die (e.g., IC die pads and/or conductive traces), (b) conductive elements of an IC package in which the IC die is mounted (e.g., IC package pins wire bonded or otherwise connected to respective IC die pads), and/or (c) electrode elements provided in a touch device, e.g., a touchscreen (e.g., provided in a smartphone, laptop, tablet, or other device), a touch button or switch, a touch pad, a touch slider, a touch surface, or other touch device. The term pin, as used herein, is not meant to be limited to any particular type of physical structure, and may include, without limitation, gull-wing or J-lead terminals, solder balls, or lands.

As discussed above, noise detection circuitry 114 may include circuitry to perform noise detection measurement(s) 130 to determine noise-related capacitance measure(s) 132 associated with a capacitance on the second capacitive sensing channel 105, and determine a presence (or absence) of a noise condition 134 based on the noise-related capacitance measure(s) 132. Noise-related capacitance measure(s) 132 determined by the noise detection circuitry 114 may include voltage, current, or other electrical property influenced by noise in the vicinity of the electronic device 100, for example, voltage ripple, radiation emissions, or electrostatic discharge near the electronic device 100.

In examples in which the first capacitive sensing channel 103 and second capacitive sensing channel 105 share a common IC die pad, both the touch detection circuitry 112 and noise detection circuitry 114 may be connected to the shared IC die pad for (a) performing respective touch detections 120 (by the touch detection circuitry 112) and (b) performing respective noise detection measurement(s) 130 (by the noise detection circuitry 114). Touch detections 120 and noise detection measurement(s) 130 using the shared IC die pad may be performed at different times, e.g., in an alternating manner. In examples in which the second capacitive sensing channel 105 is separate from the first capacitive sensing channel 103, the noise detection circuitry 114 may perform respective noise detection measurement(s) 130 (e.g., at a designated IC die pad) at any time relative to respective touch detections 120 performed by the touch detection circuitry 112.

The noise detection circuitry 114 may determine the presence (or absence) of the noise condition 134 by comparing one or more noise-related capacitance measure(s) 132 with one or more noise detection thresholds, e.g., a threshold magnitude of voltage, current, or other electrical property. For example, noise detection circuitry 114 may compare a noise-related capacitance measure 132 with a noise detection threshold, and either (a) determine the presence of the noise condition 134 if the noise-related capacitance measure 132 exceeds the threshold, or alternatively (b) determine the absence of the noise condition 134 if the noise-related capacitance measure 132 does not exceed the threshold. In some examples, a noise detection protocol implemented in the noise detection circuitry 114 may specify a determination that the noise condition 134 is present when a respective (e.g., single) noise-related capacitance measure 132 is determined to exceed the threshold. In other examples, a noise detection protocol implemented in the noise detection circuitry 114 may specify a determination that the noise condition 134 is present when a defined minimum consecutive number of noise-related capacitance measures 132 are determined to exceed the threshold (or alternatively, when a defined minimum number of noise-related capacitance measures 132 are determined to exceed the threshold within a defined time period), depending on the respective noise detection protocol implemented in the noise detection circuitry 114. A determination by the noise detection circuitry 114 that the noise condition 134 is not present may be considered herein as a determination the noise condition 134 is absent.

Noise detection threshold(s) may be stored in memory of the noise detection circuitry 114 or in separate memory accessible by the noise detection circuitry 114. In some examples, noise detection circuitry 114 may utilize noise detection thresholds, e.g., specifying different magnitudes of voltage, current, or other electrical property, wherein exceeding the different thresholds may trigger different responsive actions or generation of different control signals. In some examples, including examples that implement (a) active touch detection via first capacitive sensing channel 103 (e.g., wherein the touch detection circuitry 112 transmits signals (e.g., wave bursts) on a touch detection electrode) and (b) passive noise detection, a noise detection threshold used by the noise detection circuitry 114 may have a lower magnitude than a touch detection threshold used by the touch detection circuitry 112. In some examples, the noise detection and touch detection threshold may have the same magnitude.

As discussed above, in response to determining the presence of the noise condition 134 (e.g., a determination of respective noise-related capacitance measure(s) exceeding a noise detection threshold), the noise detection circuitry 114 may generate a touch detection inhibit signal 136 to touch detection circuitry 112 so as to inhibit at least one touch detection 120. Alternatively, if the noise detection circuitry 114 determines the noise condition 134 is absent, the noise detection circuitry 114 does not generate the touch detection inhibit signal 136.

In some examples, the touch detection inhibit signal 136 to inhibit at least one touch detection 120 may comprise a signal to inhibit a single touch detection 120, to inhibit a predefined number of touch detections 120, or to inhibit touch detections 120 for a predefined period of time. In other examples, the touch detection inhibit signal 136 may inhibit touch detections 120 until the determination (by the noise detection circuitry 114) of a defined event to continue (re-start) touch detections 120. Such defined event may comprise, for example, a defined consecutive number of noise detection determinations indicating the noise condition 134 is absent (e.g., when a defined consecutive number of noise-related capacitance measures 132 are determined not to exceed the noise detection threshold). For example, after determination of the noise condition 134, the touch detection inhibit signal 136 may initiate a debouncing process in which a noise-absence detection counter must reach a defined value (wherein the counter advance after each successive determination of an absence of the noise condition 134) before continuing (re-starting) touch detections 120.

In some examples, the touch detection inhibit signal 136 to inhibit at least one touch detection 120 comprises signaling communicated to the touch detection circuitry 112 to interrupt (i.e., prevent a performance of) at least one touch detection 120 that would otherwise be performed by the touch detection circuitry 112. In other examples, the touch detection inhibit signal 136 to inhibit at least one touch detection 120 comprises signaling communicated to the touch detection circuitry 112 to prevent or inhibit a usage of at least one touch detection 120 performed by the touch detection circuitry 112. For example, the touch detection inhibit signal 136 may allow the touch detection circuitry 112 to continue performing touch detections 120 without interruption, but may prevent or otherwise inhibit the use of the results of such touch detections 120, e.g., by preventing the touch detection circuitry 112 from signaling a detected touch to a responsive electronic device.

Figure 2:
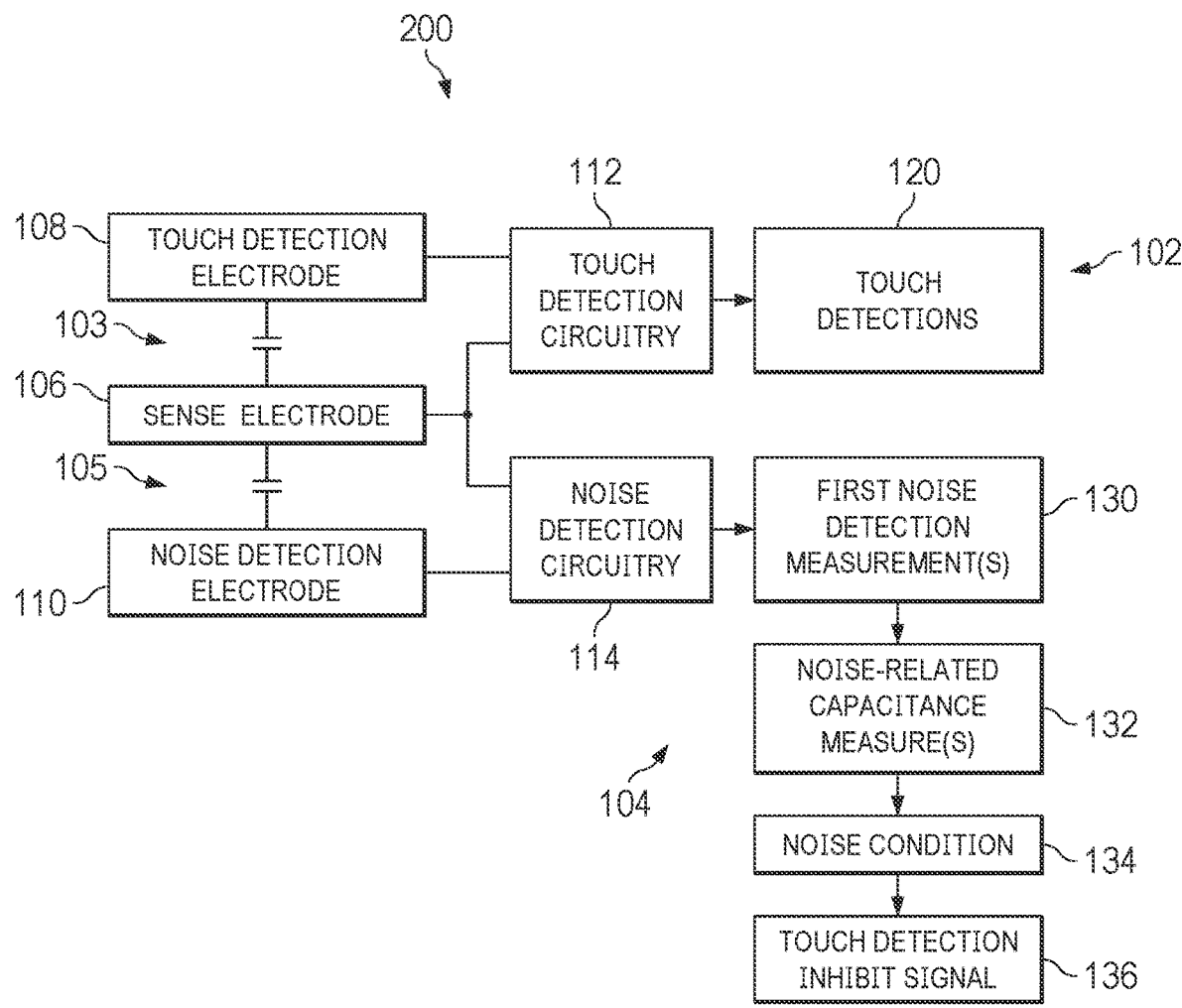
FIG. 2 shows an example implementation of the electronic device shown in FIG. 1, including a touch detection channel and a noise detection channel sharing a common electrode.

FIG. 2 shows an example electronic device 200 representing an example implementation of the electronic device 100 shown in FIG. 1 and discussed above. The example electronic device 200 includes (a) the touch detection system 102 including the first capacitive sensing channel 103 and touch detection circuitry 112 to perform touch detections 120 based on the capacitance on the first capacitive sensing channel 103, and (b) the noise detection system 104 including the second capacitive sensing channel 105 and noise detection circuitry 112 to detect noise conditions 134 and to control the operation of the electronic device 100 in response to detected noise conditions 134, e.g., as discussed above.

As shown in FIG. 2, the first capacitive sensing channel 103 connected to the touch detection circuitry 112 includes a touch detection electrode 108 capacitively coupled to a sense electrode 106, and the second capacitive sensing channel 105 connected to the noise detection circuitry 114 includes a noise detection electrode 110 capacitively coupled to the sense electrode 106. Thus, the sense electrode 106 is shared by the first capacitive sensing channel 103 and the second capacitive sensing channel 105.

The sense electrode 106, touch detection electrode 108, and noise detection electrode 110 may respectively include (a) conductive elements of an IC die (e.g., IC die pads and/or conductive traces), (b) conductive elements of an IC package in which the IC die is mounted (e.g., IC package pins wire bonded or otherwise connected to respective IC die pads), and/or (c) electrode elements provided in a touch device. In some examples (e.g., as shown in FIGS. 4-7 discussed below), the sense electrode 106 comprises an IC die pad or IC package pin connected to both the touch detection circuitry 112 and the noise detection circuitry 114. The touch detection circuitry 112 and the noise detection circuitry 114 may perform respective measurements (e.g., detecting voltage, current, or other electrical parameter) at the shared sense electrode 106 at different times (e.g., in an alternating manner), for example by selectively connecting the shared sense electrode 106 to the touch detection circuitry 112 and the noise detection circuitry 114 (e.g., using suitable switching circuitry).

In some examples, e.g., examples that perform active touch detection on the first capacitive sensing channel 103 (touch detection channel), the touch detection electrode 108 may comprise a "transmit pad" (or "drive pad") on an IC die and the sense electrode 106 may comprise a "receive pad" (or "sense pad") on the IC die, wherein signals (e.g., wave bursts) are transmitted by the touch detection circuitry 112 via the transmit pad (of the touch detection electrode 108) and signals received at the receive pad (of the sense electrode 106) are analyzed by the touch detection circuitry 112 for to perform touch detections 120 to detect a user touch, on a touch device (e.g., a touchscreen, touch button or switch, touch pad, touch slider, touch surface, or other touch device) including or connected to the IC die.

In some examples, the noise detection electrode 110 may comprise one or more passive (or "dummy") conductive structures, e.g., a passive pad ("dummy pad") on the IC die, a passive pin on an IC package in which the IC die is mounted, and/or a passive touch electrode element, without limitation. The noise detection circuitry 114 may detect noise-related capacitance measures 132 at the receive pad (of the sense electrode 106), which noise-related capacitance measures 132 represent a passive noise-related capacitance between the noise detection electrode 110 and the receive pad. In other examples, the noise detection electrode 110 may comprise an active electrode, for example wherein the noise detection circuitry 114 transmits signals (e.g., wave bursts) on the noise detection electrode 110 and analyzes resulting signals received at the sense electrode 106 to perform noise detection measurement(s) 130 to detect the noise condition 134.

Figure 3:
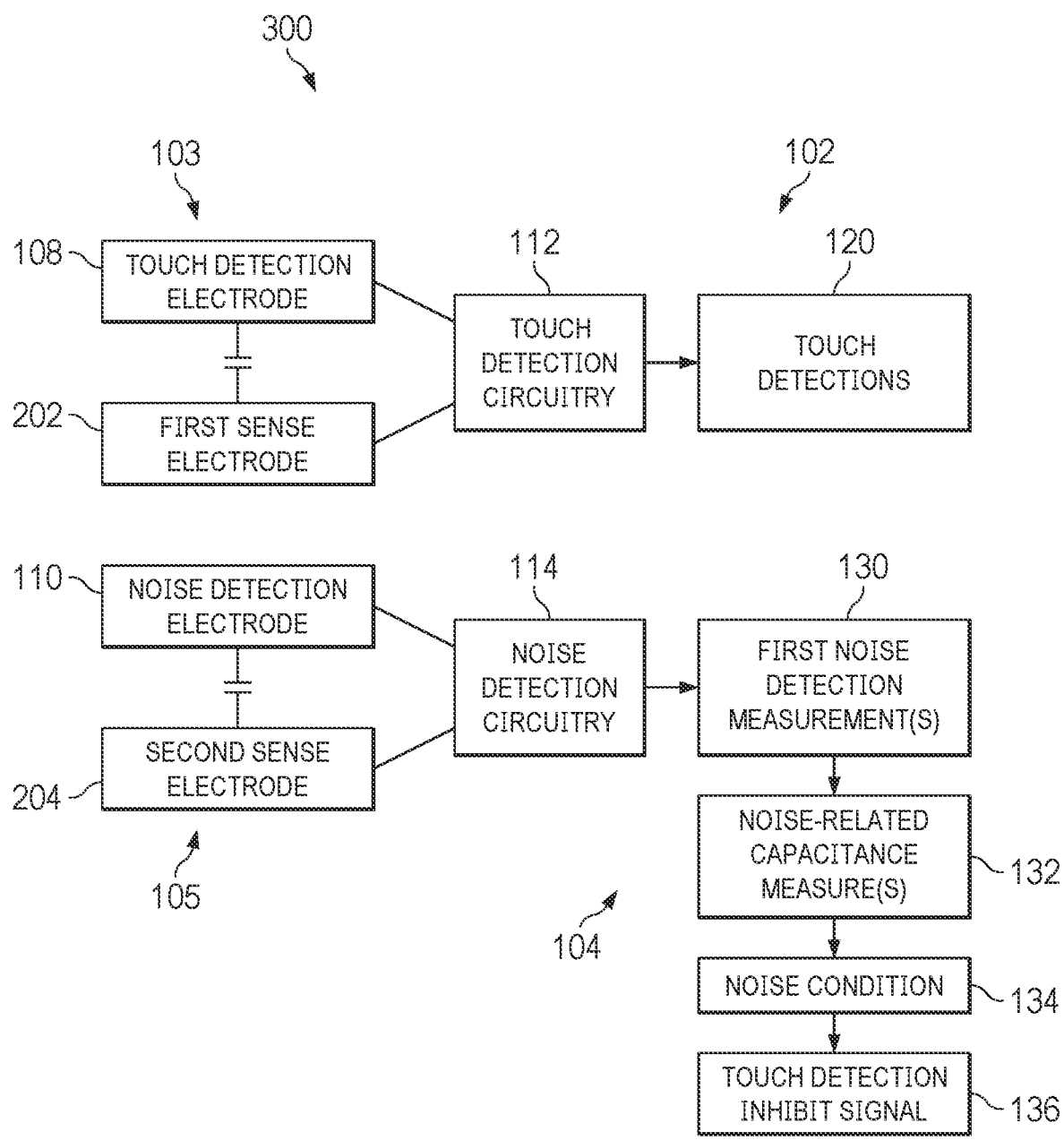
FIG. 3 shows another example implementation of the electronic device shown in FIG. 1 including a touch detection channel and a separate noise detection channel.

FIG. 3 shows an example electronic device 300 representing another example implementation of the electronic device 100 shown in FIG. 1. The example electronic device 300 may be generally similar to the example electronic device 200 shown in FIG. 2, with like references numbers referring to like parts. However, in the example electronic device 300 shown in FIG. 3, the second capacitive sensing channel 105 for noise detection is distinct from the first capacitive sensing channel 103 for touch detection, as opposed to second capacitive sensing channel 105 and first capacitive sensing channel 103 sharing a sense electrode 106 (as in the example electronic device 200 discussed above.)

As shown in FIG. 3, the first capacitive sensing channel 103 connected to the touch detection circuitry 112 includes the touch detection electrode 108 capacitively coupled to a first sense electrode 202 (e.g., corresponding with the sense electrode 106 of example electronic device 200 discussed above), and the second capacitive sensing channel 105 connected to the noise detection circuitry 114 includes the noise detection electrode 110 capacitively coupled to a second sense electrode 204. The second sense electrode 204 may be separate from the first sense electrode 202, and may comprise, for example, conductive elements of an IC die (e.g., an IC die pad and/or conductive trace), (b) a pin of an IC package in which the IC die is mounted, and/or I a respective touch electrode element.

Figure 4:
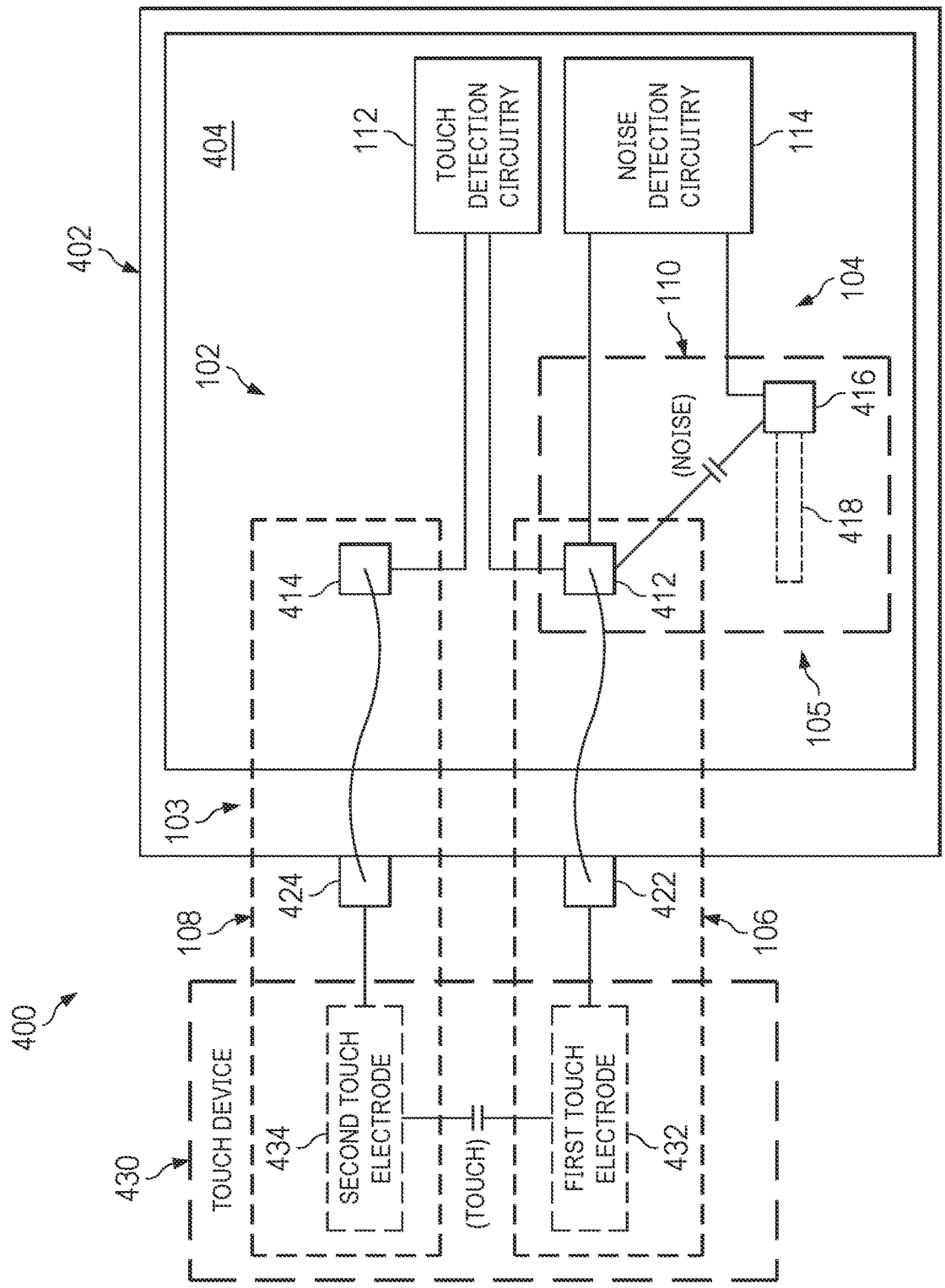
FIG. 4 shows an example implementation of the example electronic device shown in FIG. 2.

FIG. 4 shows an example electronic device 400 representing an example implementation of the example electronic device 200 shown in FIG. 2 and discussed above, wherein the example electronic device 400 is embodied in an IC package 402 including an IC die 404, and optionally a touch device 430, for example a touchscreen (e.g., provided in a smartphone, laptop, tablet, or other device), a touch button or switch, a touch pad, a touch slider, a touch surface, or other touch device. The example electronic device 400 includes (a) the touch detection system 102 including the first capacitive sensing channel 103 and touch detection circuitry 112 to perform touch detections 120 (discussed above) based on the capacitance on the first capacitive sensing channel 103, and (b) the noise detection system 104 including the second capacitive sensing channel 105 and noise detection circuitry 114 to detect noise conditions and control the operation of the electronic device 400 in response to detected noise conditions, e.g., as discussed above.

As shown in FIG. 4, the first capacitive sensing channel 103 connected to the touch detection circuitry 112 includes the touch detection electrode 108 capacitively coupled to the sense electrode 106, and the second capacitive sensing channel 105 connected to the noise detection circuitry 114 includes the noise detection electrode 110 capacitively coupled to the sense electrode 106. Thus, the sense electrode 106 is shared by the first capacitive sensing channel 103 and the second capacitive sensing channel 105, e.g., as discussed above regarding the example electronic device 200.

The sense electrode 106, the touch detection electrode 108, and the noise detection electrode 110 may include respective elements of the IC package 402, the IC die 404 mounted therein, and/or the optional touch device 430.

In the example shown in FIG. 4, the sense electrode 106 may include (a) a first die pad 412 (e.g., "receive pad") of the IC die 404, (b) a first package pin 422 of the IC package 402, and (optionally) (c) a first touch electrode element 432 provided in the optional touch device 430. The first die pad 412 is connected (e.g., wire bonded) to the first package pin 422, which is connected to the first touch electrode element 432.

The touch detection electrode 108 may include (a) a second die pad 414 (e.g., "transmit pad") of the IC die 404, (b) a second package pin 424 of the IC package 402, and (optionally) (c) a second touch electrode element 434 provided in the optional touch device 430. The second die pad 414 is connected (e.g., wire bonded) to the second package pin 424, which is connected to the second touch electrode element 434. The second touch electrode element 434 is capacitively coupled to the first touch electrode element 432, e.g., for detecting a touch at a respective location on the touch device 430.

The noise detection electrode 110 may include a third die pad 416 (e.g., "dummy pad") and/or optional conductive trace(s) 418 formed in the IC die 404. The noise detection electrode 110 is capacitively coupled to the first touch electrode element 432 (in particular, to the first die pad 412), e.g., for detecting noise in the vicinity of the electronic device 400. The dimensions and/or location of the optional conductive trace(s) 418 relative to the third die pad 416 may be selected to provide a desired noise detection sensitivity.

In some examples, the IC die 404 may comprise a microcontroller. As noted above, the touch device 430 may comprise a touchscreen, touch button or switch, touch pad, touch slider, touch surface, or other touch device. The IC package 402 may be included in the touch device 430, or otherwise connected to the touch device 430.

Figure 5:
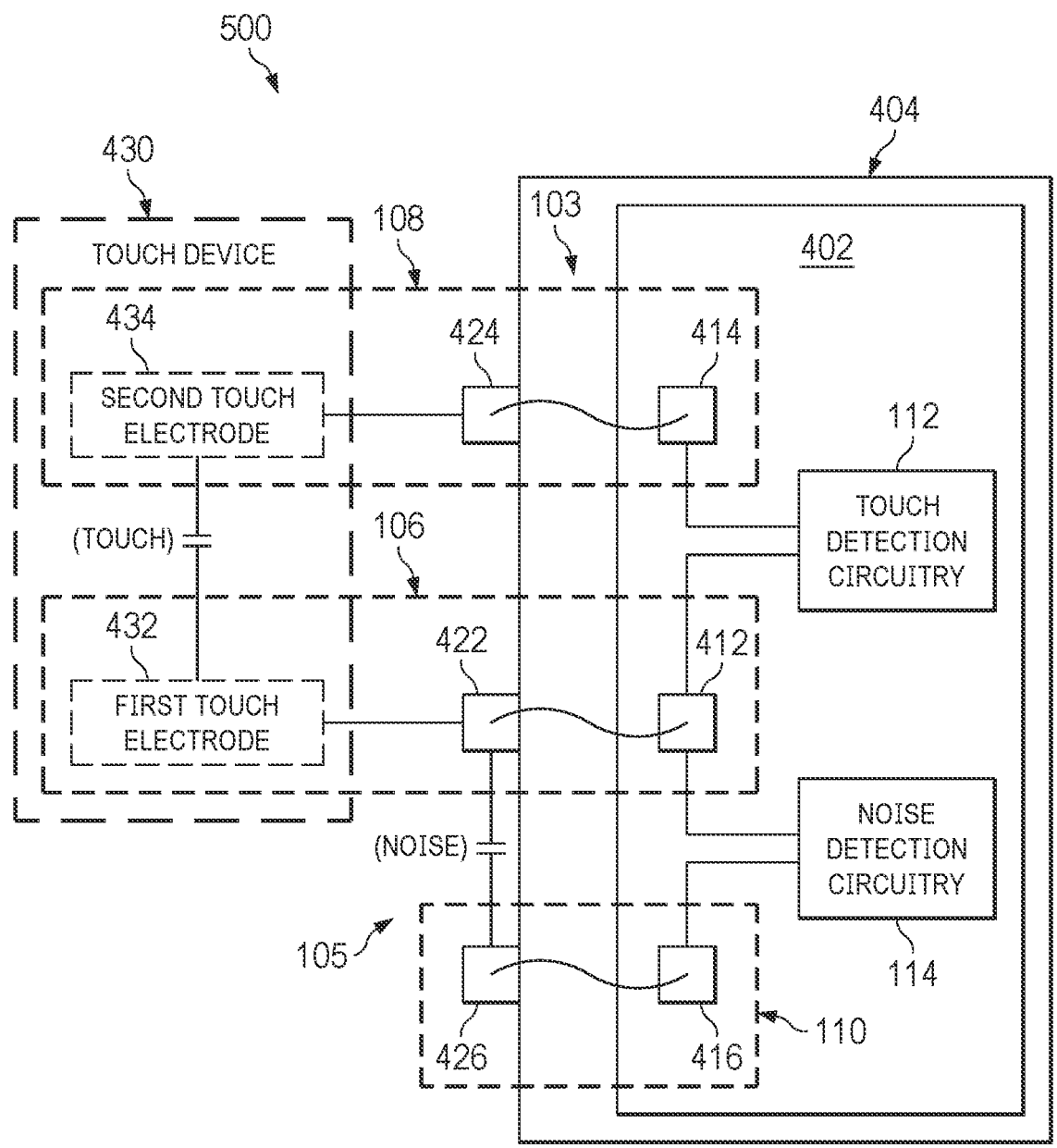
FIG. 5 shows another example implementation of the example electronic device shown in FIG. 2.

FIG. 5 shows an example electronic device 500 representing another example implementation of the example electronic device 200 shown in FIG. 2. The example electronic device 500 may be generally similar to the example electronic device 400 shown in FIG. 4, with like references numbers referring to like parts. However, in the example electronic device 500 shown in FIG. 5, the noise detection electrode 110 may include the third die pad 416 (e.g., "dummy pad") connected (e.g., wire bonded) to a third package pin 426 of the IC package 404. The third package pin 426 (of the noise detection electrode 110) is capacitively coupled to the first package pin 422 (of the sense electrode 106), e.g., for detecting noise in the vicinity of the IC package 404.

Figure 6:
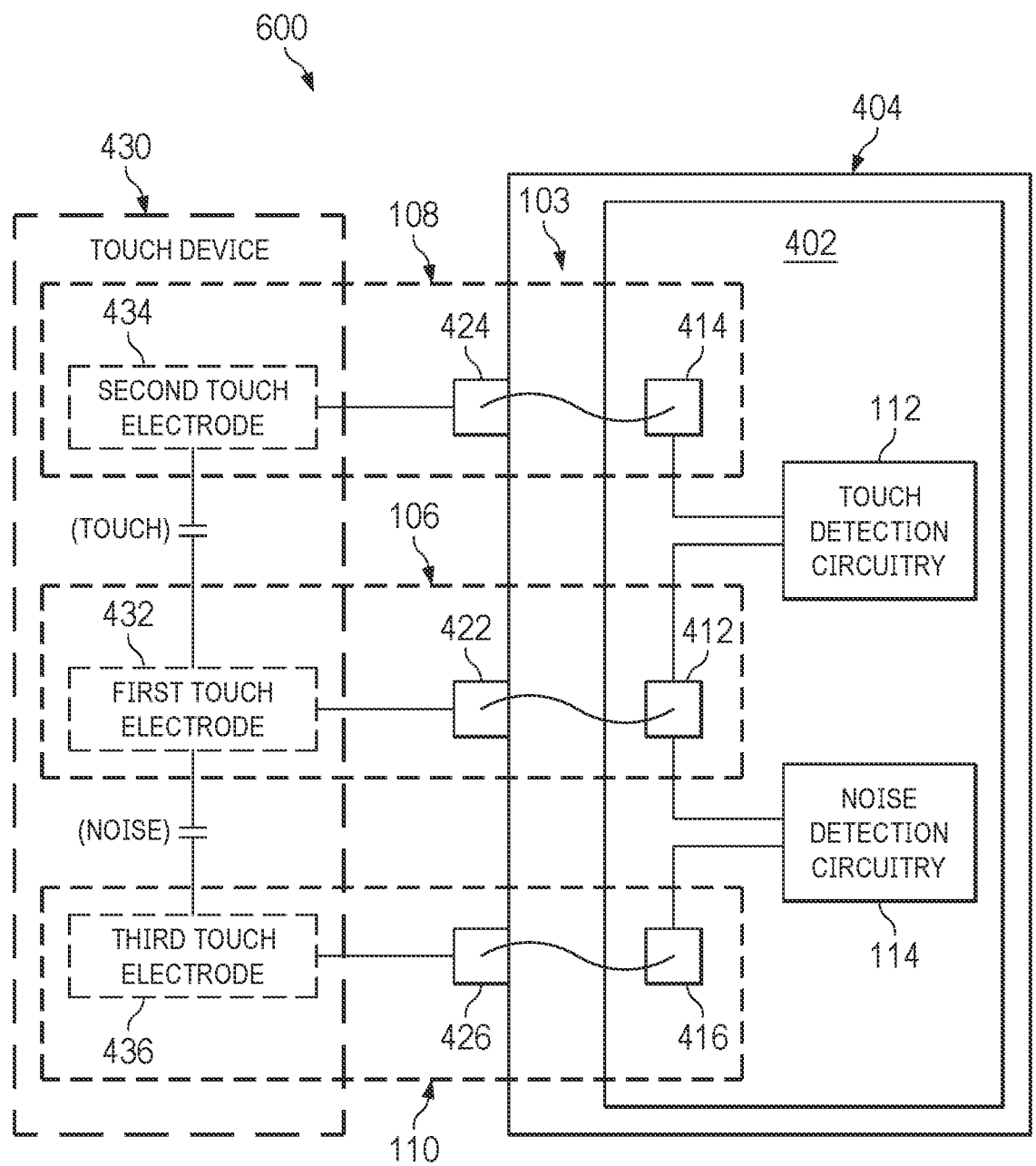
FIG. 6 shows another example implementation of the example electronic device shown in FIG. 2.

FIG. 6 shows an example electronic device 600 representing another example implementation of the example electronic device 200 shown in FIG. 2. The example electronic device 600 may be generally similar to the example electronic devices 400 and 500 shown respectively in FIGS. 4 and 5, with like references numbers referring to like parts. However, in the example electronic device 600 shown in FIG. 6, the noise detection electrode 110 may include a third touch electrode element 436 capacitively coupled to the first touch electrode element 432 (of the sense electrode 106), e.g., for detecting noise in the vicinity of the IC package 404. As shown, the third touch electrode element 436 may be connected to the third package pin 426, which is connected (e.g., wire bonded) to the third die pad 416 (e.g., "dummy pad").

The third touch electrode element 436 (of the noise detection electrode 110) may be located remotely from the first touch electrode element 432 (of the sense electrode 106), or otherwise located or arranged in the touch device 430 to prevent touch-based capacitive coupling between the third touch electrode element 436 and first touch electrode element 432.

Figure 7:
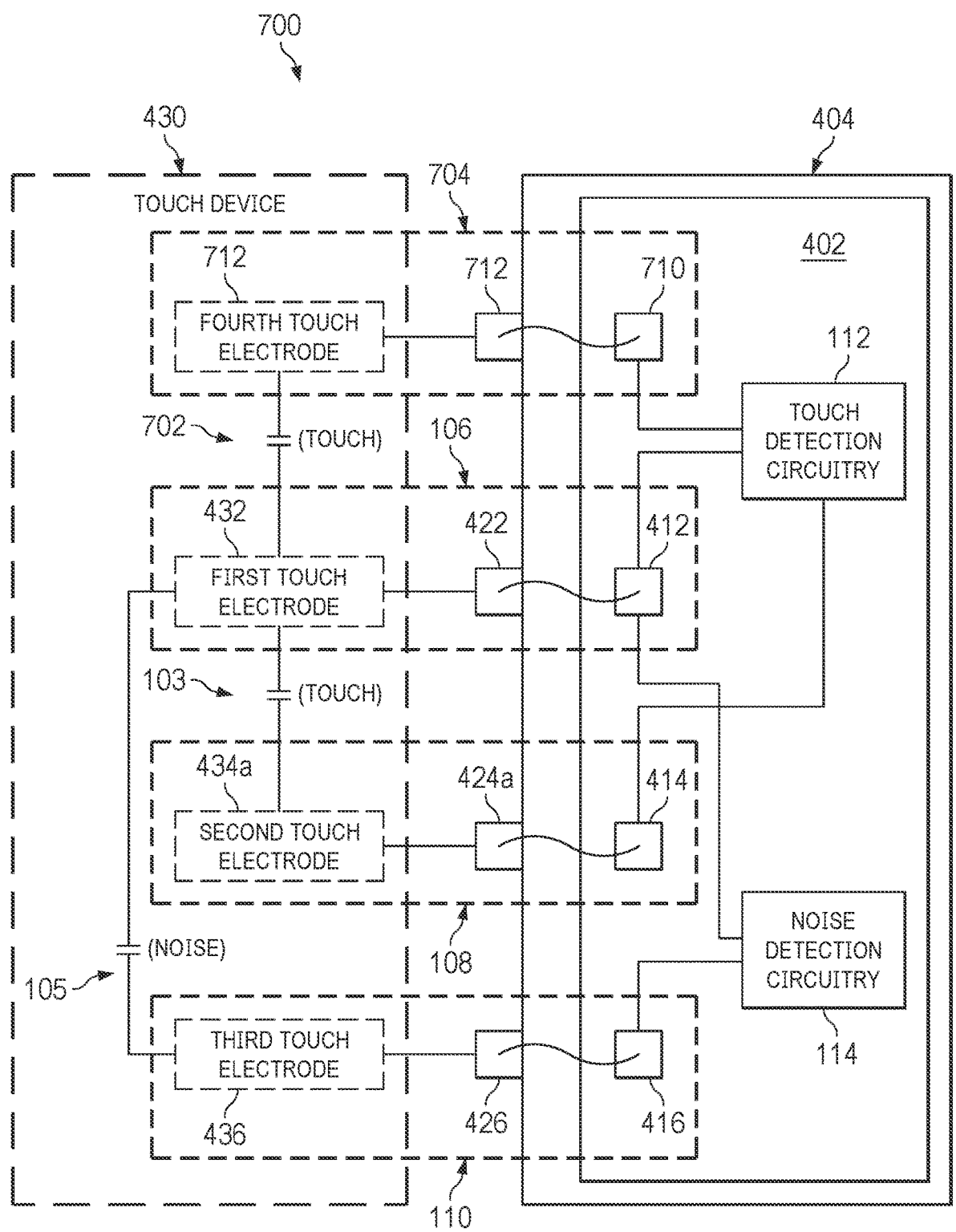
FIG. 7 shows an example electronic device including multiple touch detection channels.

FIG. 7 shows an example electronic device 700 representing another example implementation of the example electronic device 200 shown in FIG. 2. The example electronic device 700 may be generally similar to the example electronic devices 400, 500, and 600 shown respectively in FIGS. 4-6, with like references numbers referring to like parts. However, the example electronic device 700 shows a third capacitive sensing channel 702 including an additional touch detection electrode 704 capacitively coupled to the sense electrode 106, wherein the additional capacitive sensing channel 702 is connected to the touch detection circuitry 112 to perform touch detections 120 based on a capacitance on the third capacitive sensing channel 702. Thus, electronic device 700 includes at least two touch detection channels, namely the first capacitive sensing channel 103 and the third capacitive sensing channel 702, sharing the sense electrode 106.

As shown, the additional touch detection electrode 704 may include (a) a fourth die pad 710 (e.g., an additional "transmit pad") of the IC die 404, (b) a fourth package pin 712 of the IC package 402, and (c) a fourth touch electrode element 712 provided in the optional touch device 430. The fourth die pad 710 is connected (e.g., wire bonded) to the fourth package pin 712, which is connected to the fourth touch electrode element 712. The fourth touch electrode element 712 is capacitively coupled to the first touch electrode element 432, e.g., for detecting a touch at a respective location on the touch device 430.

It should be understood that any of the example electronic devices disclosed herein may include any number of touch detection channels (e.g., one, two, or more touch detection channels), wherein respective touch detection channels may (or may not) share a sense electrode with one or more other touch detection channels.

Further, the noise detection electrode 110 may include the third touch electrode element 436 capacitively coupled to the first touch electrode element 432 (of the sense electrode 106), e.g., for detecting noise (by noise detection circuitry 114) in the vicinity of the IC package 404.

Figure 8:
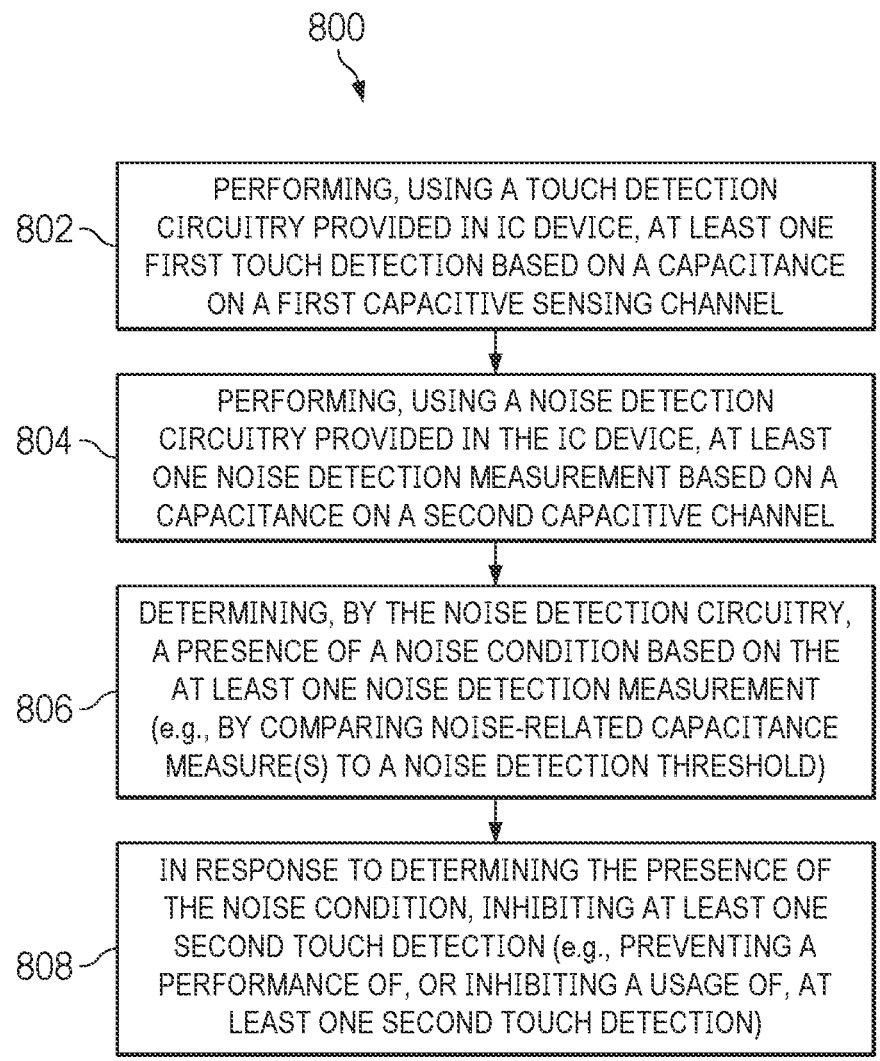
FIG. 8 shows an example method for managing capacitive touch detection, e.g., implemented by any of the example electronic devices disclosed herein.

FIG. 8 shows an example method 800 for managing capacitive touch detection. The example method 800 may be performed by any of the example devices disclosed herein.

At 802, a touch detection circuitry provided in an IC device may perform at least one first touch detection based on a capacitance on a first capacitive sensing channel. For example, the touch detection circuitry may transmit signals via a transmit pad on an IC die, receive resulting signals on a receive pad on the IC die, and determine the presence of a user touch based on the received signals.

At 804, a noise detection circuitry provided in the IC device may perform at least one noise detection measurement based on a capacitance on a second capacitive channel. The second capacitive channel may or may not share an electrode with the first capacitive channel, depending on the particular implementation, as discussed above. In some examples, performing a respective noise detection measurement comprises determining a respective noise-related capacitance measure (e.g., voltage, current, or other electrical parameter) associated with a capacitance on the second capacitive channel.

At 806, the noise detection circuitry may determine a presence (or absence) of a noise condition based on the at least one noise detection measurement at 804. For example, the noise detection circuitry may compare one or more noise-related capacitance measures (e.g., voltage, current, or other electrical parameter(s)) with at least one noise detection threshold to determine the presence (or absence) of the noise condition.

At 808, in response to determining the presence of the noise condition, the noise detection circuitry may inhibit at least one second touch detection. (Alternatively, if the noise condition is determined to be absent at 806, the noise detection circuitry may allow touch detections to continue, without interruption). For example, the noise detection circuitry may prevent a performance of at least one second touch detection by the touch detection circuitry. As another example, the noise detection circuitry may prevent a predefined number of second touch detections or prevent second touch detections for a predefined period of time. As another example, the noise detection circuitry may prevent second touch detections until a determination, by the noise detection circuitry, that the noise condition is absent. For example, a determination that the noise condition is absent may comprise a determination, by the noise detection circuitry, that the noise condition is not present for a predefined minimum number of noise detection measurements. As still another example, the noise detection circuitry may prevent or inhibit a use of at least one second touch detection performed by the touch detection circuitry.

Figure 9:
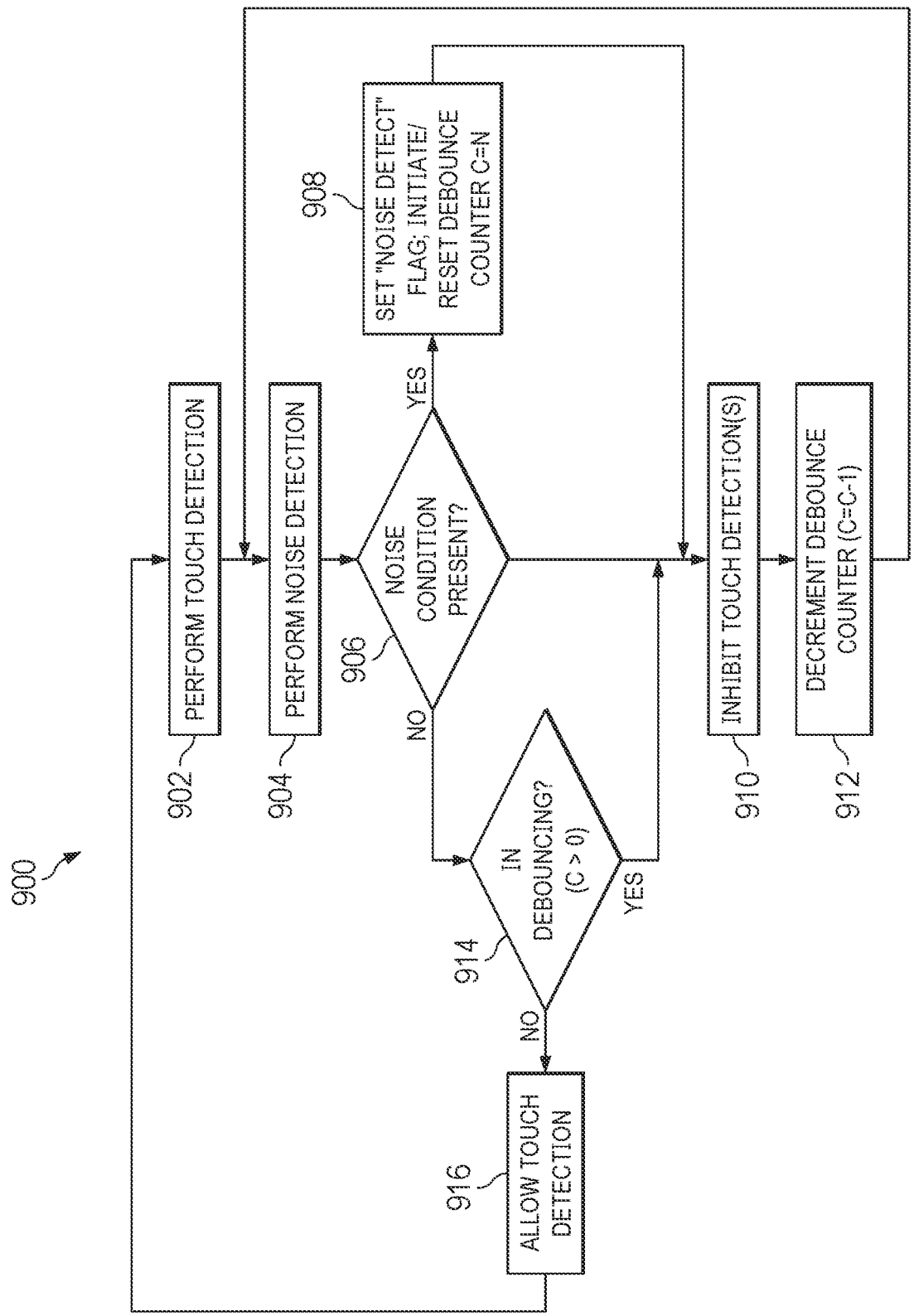
FIG. 9 shows another example method for managing capacitive touch detection, e.g., implemented by any of the example electronic devices disclosed herein.

FIG. 9 shows an example method 900 for managing capacitive touch detection. The example method 900 may be performed by any of the example devices disclosed herein.

At 902, a touch detection circuitry may perform at least one first touch detection based on a capacitance on a first capacitive sensing channel, e.g., as discussed above.

At 904, a noise detection circuitry may perform at least one noise detection measurement based on a capacitance on a second capacitive channel, e.g., as discussed above.

At 906, the noise detection circuitry may determine whether a noise condition is present, based on the at least one noise detection measurement at 904, e.g., as discussed above.

If the noise detection circuitry determines a noise condition is present at 906, the noise detection circuitry at 908 may set a "noise detect" flag indicating the noise condition, and initiate or reset a debounce counter at 908, by setting a value C of the debounce counter to N (i.e., setting C=N), wherein N represents a number of consecutive determinations (at 904-906) that the noise detection is absent (no longer present) before returning to 902 to resume touch detections.

After setting the "noise detect" flag and setting the debounce counter C=N at 908, the noise detection circuitry may inhibit touch detection(s) at 910 and decrement the debounce counter C at 912 (i.e., C=C−1), and the method may proceed to the next noise detection determination at 904.

Alternatively, if the noise detection circuitry determines at 906 that the noise condition is absent (not present), the noise detection circuitry may determine at 914 whether the system is currently in a (previously initiated) debouncing process, i.e., by determining whether the debounce counter C>0. If the system is currently in a debouncing process (C>0), the method may continue to inhibit touch detection(s) at 910 and decrement the debounce counter C at 912 (i.e., C=C−1), and the method may proceed to the next noise detection determination at 904. Alternatively, if the system is not currently in a debouncing process (i.e., debounce counter C=0), touch detections are allowed to continue at 916, and the method may return to 902 for a next touch detection. It should be understood that the debounce process (including the example debounce counter) shown in FIG. 9 and discussed above represent one example implementation, and the debounce process and/or debounce counter may be otherwise implemented in any suitable manner.

Although example embodiments have been described above, other variations and embodiments may be made from this disclosure without departing from the spirit and scope of these embodiments.

The invention claimed is:

1. An electronic device, comprising:
a touch device including:
a first touch electrode element; and
a second touch electrode element; and
an IC package connected to the touch device and including:
a first IC package conductive element; and
a second IC package conductive element;
a sense electrode including the first touch electrode element of the touch device;
a touch detection electrode including the second touch electrode element of the touch device; and
a touch detection system including:
a first capacitive sensing channel including a capacitive coupling between the touch detection electrode and the sense electrode; and
a touch detection circuitry to perform a series of touch detections based on a capacitance on the first capacitive sensing channel; and
a noise detection system including:
a second capacitive sensing channel including a capacitive coupling between the first IC package conductive element and second IC package conductive element of the IC package; and
a noise detection circuitry to:
perform at least one noise detection measurement, wherein a respective noise detection measurement comprises determining a respective noise-related capacitance measure associated with a capacitance on the second capacitive channel; and
determine a presence of a noise condition based on the at least one noise detection measurement; and
in response to determining the presence of the noise condition, generate a touch detection inhibit signal to inhibit at least one touch detection in the series of touch detections.

2. The electronic device of claim 1, wherein:
the sense electrode includes the first touch electrode element and the first IC package conductive element.

3. The electronic device of claim 1, wherein:
performing a respective touch detection in the series of touch detections comprises detecting a touch-related capacitance measure at the sense electrode at a first time; and
performing the respective noise detection measurement comprises detecting the respective noise-related capacitance measure at the sense electrode at a second time distinct from the first time.

4. The electronic device of claim 1, wherein the IC package includes:
an IC die including the touch detection circuitry, the noise detection circuitry, and a plurality of IC die pads including a first IC die pad, a second IC die pad, and a third IC die pad; and
a plurality of IC package pins, including:
a first IC package pin connected to the first IC die pad; and
a second IC package pin connected to the second IC die pad;
wherein the sense electrode includes the first touch electrode element, the first IC die pad, and the first IC package pin connected to the first IC die pad;
wherein the touch detection electrode includes the first touch electrode element, the second IC die pad, and the second IC package pin connected to the second IC die pad; and
wherein the second IC package conductive element comprises the third IC die pad; and
wherein the second capacitive sensing channel includes a capacitive coupling between the third IC die pad and the first IC die pad.

5. The electronic device of claim 4, wherein the second IC package conductive element comprises the third IC die pad and a conductive trace extending from the third IC die pad.

6. The electronic device of claim 4, wherein:
the plurality of IC package pins includes a third IC package pin connected to the third IC die pad.

7. The electronic device of claim 1, wherein determining the presence of the noise condition based on the at least one noise-related capacitance measurement comprises comparing the at least one noise-related capacitance measure to a noise detection threshold.

8. The electronic device of claim 1, wherein generating the touch detection inhibit signal to inhibit the at least one touch detection comprises generating the touch detection inhibit signal to prevent a performance of the at least one touch detection.

9. The electronic device of claim 1, wherein generating the touch detection inhibit signal to inhibit the at least one touch detection comprises generating the touch detection inhibit signal to inhibit a usage of the at least one touch detection.

10. The electronic device of claim 1, wherein generating the touch detection inhibit signal to inhibit the at least one touch detection comprises generating the touch detection inhibit signal to inhibit a predefined multiple number of touch detections.

11. The electronic device of claim 1, wherein the noise detection circuitry to:
perform at least one further noise detection measurement, wherein a respective further noise detection measurement comprises determining a respective further noise-related capacitance measure associated with the capacitance on the second capacitive channel;
determine an absence of the noise condition based on the at least one further noise detection measurement; and
in response to the determination of the absence of the noise condition, not generate the touch detection inhibit signal.

12. The electronic device of claim 1, wherein the touch detection circuitry to perform a respective touch detection in the series of touch detections by:
determining a capacitance measure associated with a capacitance on the first capacitive sensing channel; and
comparing the touch-related capacitance measurement to a touch detection threshold.

13. The electronic device of claim 1, comprising:
an IC die including the touch detection circuitry and the noise detection circuitry;
a touch device including:
a first touch electrode element connected to a first IC pad of the IC die; and
a second touch electrode element connected to a second IC pad of the IC die and capacitively coupled to the first touch electrode element;
wherein the first touch electrode element and the second touch electrode element are arranged along the first capacitive sensing channel; and
wherein the touch detection circuitry to perform a series of touch detections based on a capacitive coupling between the first touch electrode element and the second touch electrode element.

14. The electronic device of claim 1, wherein:
the IC package includes a first IC package pin and a second IC package pin; and
the first IC package pin defines the first IC package conductive element, and the second IC package pin defines the second IC package conductive element, such that the second capacitive sensing channel includes a capacitive coupling between the first IC package pin and the second IC package pin.

15. The electronic device of claim 1, wherein the first capacitive sensing channel includes a capacitive coupling between the first and second touch electrode elements of the touch device.

16. A method, comprising:
performing, using a touch detection circuitry provided in an integrated circuit, at least one first touch detection based on a capacitance on a first capacitive sensing channel;
performing, using a noise detection circuitry provided in the IC device, at least one noise detection measurement based on a capacitance on a second capacitive channel;
determining, by the noise detection circuitry, a presence of a noise condition based on the at least one noise detection measurement; and
in response to determining the presence of the noise condition, inhibiting at least one second touch detection by (a) preventing a performance of at least one second touch detection by the touch detection circuitry or (b) performing at least one second touch detection by the touch detection circuitry but preventing or inhibiting the use of the at least one performed second touch detection.

17. The method of claim 16, wherein:
performing the at least one noise detection measurement comprises determining at least one noise-related capacitance measure associated with the capacitance on the second capacitive channel; and
determining the presence of the noise condition comprises comparing the at least one noise-related capacitance measure to a noise detection threshold.

18. The method of claim 16, wherein inhibiting at least one second touch detection comprises preventing a predefined number of second touch detections or preventing second touch detections for a predefined period of time.

19. The method of claim 16, wherein inhibiting at least one second touch detection comprises preventing second touch detections until a determination, by the noise detection circuitry, that the noise condition is absent.

20. The method of claim 19, wherein the determination, by the noise detection circuitry, that the noise condition is absent comprises a determination, by the noise detection circuitry, that the noise condition is not present for a predefined minimum number of noise detection measurements.

21. The method of claim 16, wherein:
performing at least one first touch detection comprises detecting at least one first touch at a touch device; and
inhibiting at least one second touch detection comprises (a) inhibiting a detection of at least one second touch at the touch device or (b) inhibiting a use of at least one detected second touch at the touch device.

22. The method of claim 16, comprising:
performing at least one further noise detection measurement, wherein a respective further noise detection measurement comprises determining a respective further noise-related capacitance measure associated with the capacitance on the second capacitive channel;
determining an absence of the noise condition based on the at least one further noise detection measurement; and
in response to determining the absence of the noise condition, not generating the touch detection inhibit signal.

23. The method of claim 16, comprising:
performing the at least one first touch detection based on a capacitive coupling between a first touch electrode element of a touch device and a second touch electrode element of the touch device; and
performing the at least one noise detection measurement based on a capacitive coupling between a first IC package conductive element and a second IC package conductive element of an IC package connected to the touch device.

24. The method of claim 23, wherein the first and second IC package conductive elements of the IC package connected to the touch device comprise either (a) first and second conductive pads formed on an IC die of the IC package or (b) first and second package pins of the IC package.

* * * * *